REMOTE CONTROLLED SYSTEM FOR REDUCING DISTORTION

INVENTOR
R. W. HAMMING
BY [signature]
ATTORNEY

United States Patent Office 3,440,539
Patented Apr. 22, 1969

3,440,539
REMOTE CONTROLLED SYSTEM FOR REDUCING DISTORTION

Richard W. Hamming, Chatham Township, Morris County, N.J., assignor to Bell Telephone Laboratories, Incorporated, New York, N.Y., a corporation of New York
Filed Dec. 16, 1964, Ser. No. 418,634
Int. Cl. H04b 1/10, 15/00
U.S. Cl. 325—65 9 Claims

ABSTRACT OF THE DISCLOSURE

In a multiple channel communications system, a remote repeater in addition to relaying communications signals is caused to transmit data concerning ambient conditions and operating characteristics in the repeater which effect distortion in the signals. Signals received from the remote repeater are connected in a receiver to a feedback arrangement which includes a duplicate of the remote repeater. By adjusting the duplicate repeater in accordance with the received data concerning ambient conditions and operating characteristics, distortion is produced in the feedback loop which is substantially identical to the distortion produced by the remote repeater, and the distortion in the communications signals is effectively cancelled. Also included in the feedback loop is an attenuator which is adjusted in accordance with the received power level of the signals and the power output level of the remote repeater. This adjustable attenuator simulates attenuation introduced by the transmission path.

Figure 1:
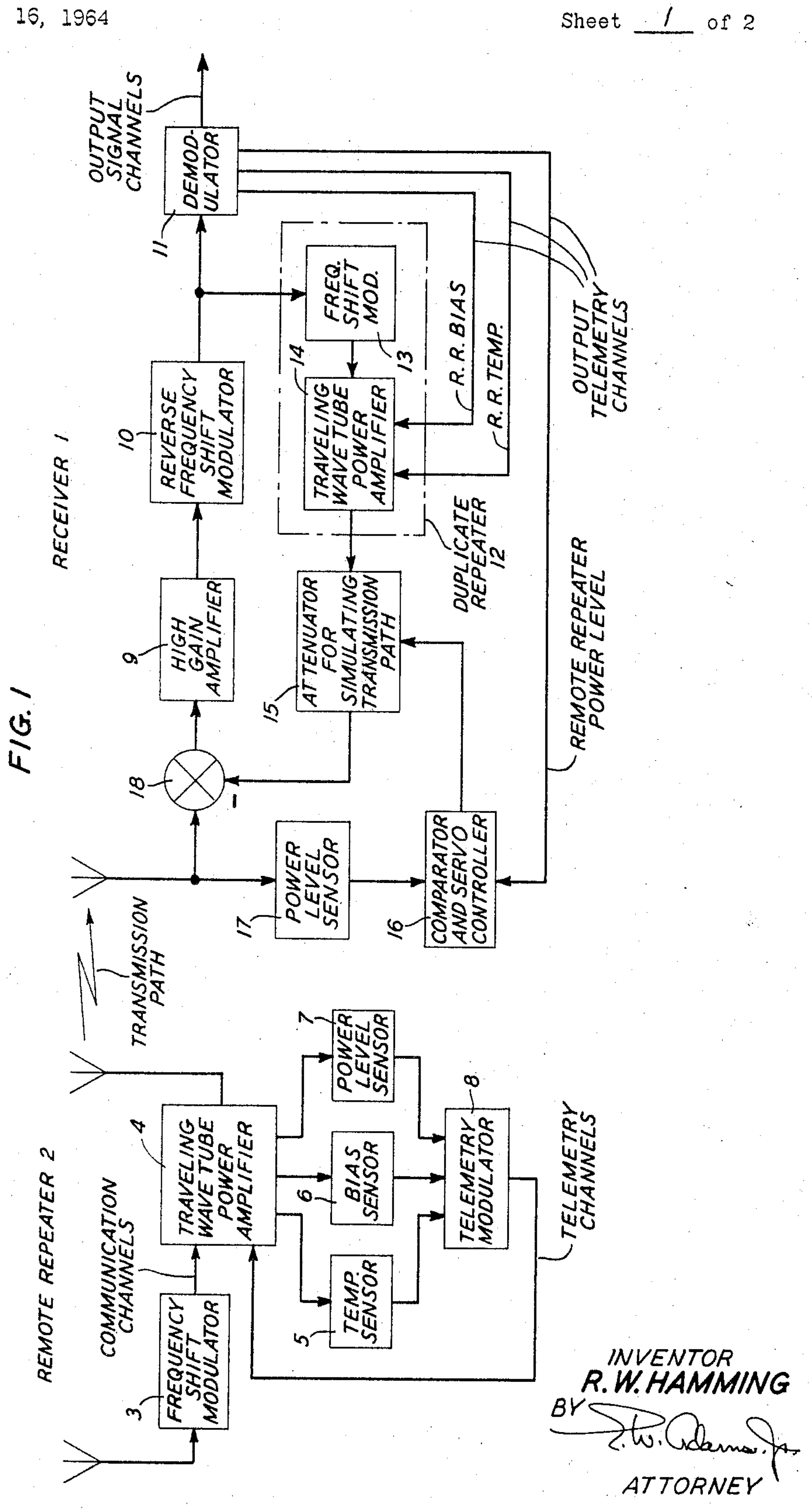

This invention relates to the reduction of distortion in communication systems.

In many types of communication systems, signals must be amplified or repeated at least once between the transmitter and the receiver. The repeaters employed for this purpose frequently have a limited amount of power available. For example, in submarine cable systems, direct-current power, limited by insulation and voltage breakdown difficulties, must be transmitted through the cable along with the signals. As a further example, in earth satellite communication systems, the size and weight limitations placed upon an earth satellite limit the amount of power available to the repeater in the satellite.

A power-limited repeater frequently distorts the signals that it is amplifying. For instance, in a satellite communication system, a traveling wave tube power amplifier is used in such a way that it is operating near its maximum power level in order to obtain the most efficient use of its available power. Any substantial increases of the signal levels in the traveling wave tube tend to "saturate" it so that the increase in output signal level is not proportionately great. Moreover, the distortion produced by a traveling wave tube is dependent upon its operating temperature and its bias voltages. In general, it may be said that a highly variable nonlinear distortion occurs in such a repeater. In contrast, the ground terminal receiver of an earth satellite communication system or the shore terminal receiver of a submarine cable communication system is not power-limited. It is economically preferable to reduce the accumulated distortion of a signal at such a receiver. It is known that substantially stable distortion produced at a prior point in a communication system may be compensated at such a receiver by placing a network that is the equivalent or duplicate of the distorting transmission network in the feedback loop of a high gain amplifier, as taught in Patent No. 2,284,555 to H. S. Black, issued May 26, 1942. However, the system envisioned in the Black patent is ineffective when the ambient conditions and operating characteristics that determine the distortion vary with respect to time. In fact, under these conditions, the overall distortion may be increased rather than reduced by the use of a feedback network as disclosed in the Black patent.

Accordingly, it is the object of this invention to reduce distortion in communication systems subject to linear and nonlinear distortion due to either (or both) the physical components and the transmission path.

A further object of the invention is to reduce distortion in signals from a remote repeater that produces nonlinear distortion that is dependent upon the time variable repeater ambient conditions and operating characteristics and upon the transmission path.

According to the invention, the ambient conditions and operating characteristics of the network intended as the equivalent of the distorting repeater and intervening transmission path are remotely controlled from the repeater in response to any repeater ambient condition or operating characteristic that may affect the distortion produced. In a specific embodiment of the invention involving a mulitple channel communication system, data concerning the repeater ambient conditions and operating characteristics are transmitted over a few of the channels, while communication signals are transmitted in the remaining channels. After demodulation in the receiver, the various data are applied to adjust appropriate parts of a feedback loop of a high gain amplifier in the receiver to permit the feedback loop continuously to simulate the distortion of the repeater.

Figure 2:
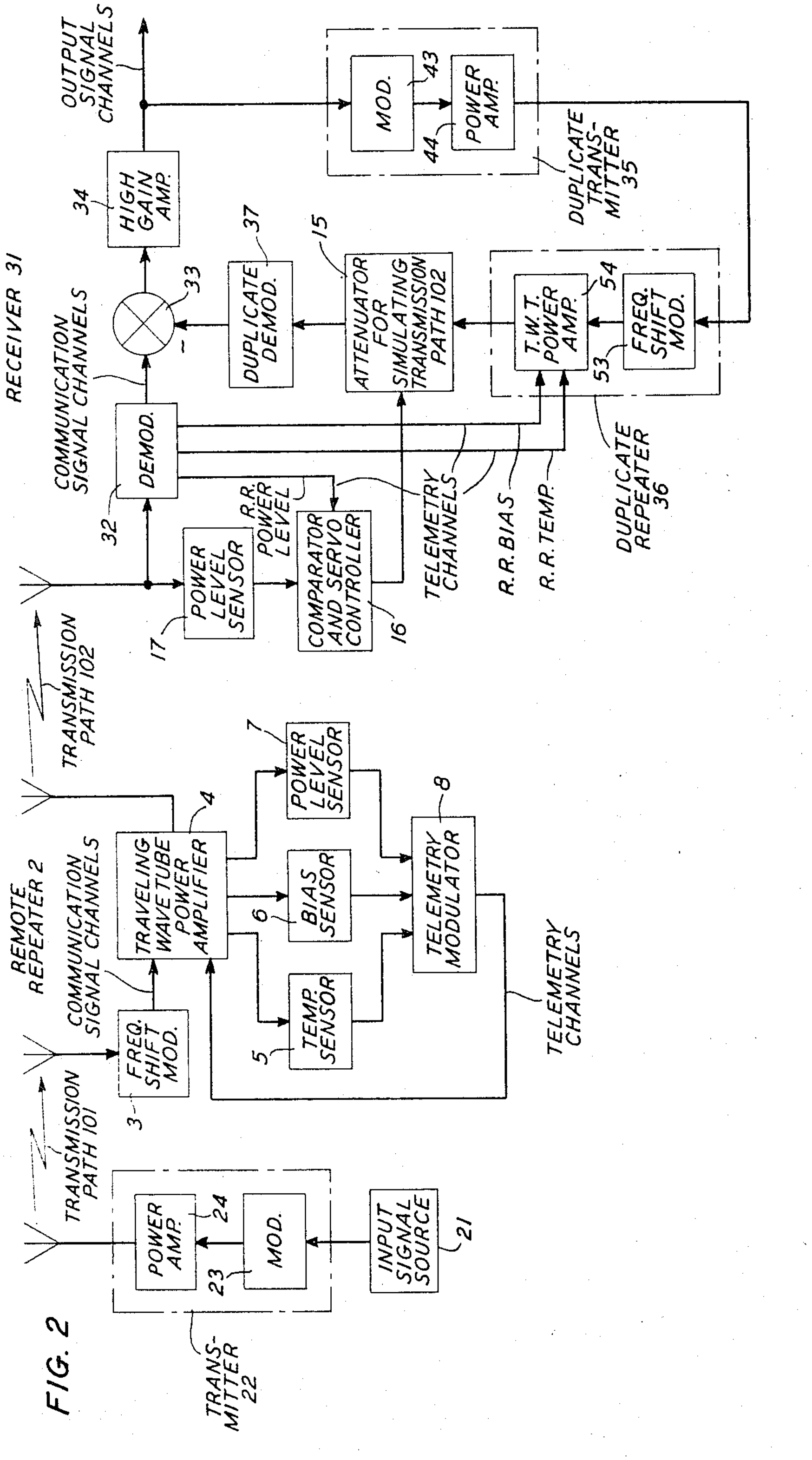

Further features and advantages of the invention will become apparent from a consideration of the following detailed description in conjunction with the drawing in which:

FIG. 1 is a block diagram illustrative of a first embodiment of the invention, and FIG. 2 is a block diagram illustrative of a second embodiment of the invention.

In FIG. 1, a microwave communication receiver 1 is separated from a remote microwave repeater 2 by a transmission path that may have a substantial length. In fact, in an earth satellite communication system, the length of the path will constantly be changing. With or without changing length, the attenuation and dispersion of this path will constantly be changing, so that for a given output power level of repeater 2, the received power at receiver 1 will vary with respect to time.

Moreover, repeater 2, in typical fashion may comprise a traveling wave amplifier 4 which raises the power level of the output of a frequency shift modulator 3 to a value appropriate for radiation to receiver 1. Whenever the output power level of repeater 2 varies in response to a change in the level of the signals applied to frequency shift modulator 3, the output signals from traveling wave tube power amplifier 4 may be distorted with respect to the signals applied to it by the frequency shift modulator 3 because, as noted above, the traveling wave tube power amplifier 4 is preferably operated near its maximum power output level in order to make most efficient use of the limited available power. The nature of this distortion is highly variable because for one level of signals from modulator 3, amplifier 4 may be amplifying substantially linearly; but, for a slightly higher level of signals, amplifier 4 may be amplifying substantially nonlinearly.

It is known that the exact signal level at which the shift in operation of amplifier 4 occurs is highly dependent upon its operating temperature and its bias voltages. Other ambient conditions and operating characteristics may also play a role in the distortion produced by repeater 2. However, it is within the capabilities of the state of the art to identify those other conditions and characteristics which have more than a negligible effect on distortions. It is one advantage of the present invention that they need only to be identified. It is not necessary to investigate the way in which, or the extent to which, they exert an influence. According to the invention, the distortion-causing conditions are sensed and quantitative data regarding them are transmitted telemetrically to the receiver, there to control the operation of the compensating replica of the distortion producing network.

As shown in the drawing, temperature, bias and average power level are chosen as relevant conditions for exemplary consideration. The temperature may be determined by a sensor 5 which may be a thermocouple element positioned on or near the tube casing of traveling wave tube power amplifier 4 and connected to apply its output voltage to telemetry system transmitter including a first microwave modulator circuit in telemetry modulator 8. A bias sensor 6 comprises one or more buffer amplifiers each having an input connected across the bias supply that establishes the direct-current bias with respect to ground of one of the electrodes of traveling wave tube amplifier 4. Such a buffer amplifier in bias sensor 6 has its output connected to a second microwave modulator circuit in telemetry modulator 8. Average power level may be determined by a sensor 7 which may comprise a directional coupler having an input connected to the output of amplifier 4, having a principal output connected to the transmitting antenna and an auxiliary output terminated in a power absorbing element that has a resistance that is dependent on the average power absorbed. Such an element comprises a thermistor including a mixture of semiconductors, such as described by G. C. Southworth in the book, Principles and Applications of Waveguide Transmission (1950), at pages 653 through 655. The thermistor and a suitable A.C. voltage source may be coupled serially across the input of a third microwave modulator circuit in telemetry modulator 8. Modulator 3 and the modulator circuits in modulator 8 may be of any type, for example, that disclosed in G. R. P. Marié Patent No. 3,096,474, issued July 2, 1963.

The outputs of the modulator circuits in telemetry modulator 8 are applied to the input of the broadband traveling wave tube power amplifier 4, which can amplify these signals simultaneously with the signals in the communication channels. The outputs of telemetry modulator 8 may be designated the telemetry channels.

Both the communication signals and the telemetry signals are transmitted from the repeater 2 to the receiver 1 through the transmission path which may, as has been described hereinbefore, have a variable attenuation and dispersion. At receiver 1 the signals are derived from the transmission path by a receiving antenna and applied by way of a summing device 18. Summing device 18 may be a differential amplifier of which G. Klein Patent No. 2,780,682, issued Feb. 5, 1957, may be considered representative. A feedback signal derived in a manner to be described is also applied to summing device 18 and modifies the signal applied to amplifier 9 from the receiving antenna. The received signals are also applied to a power level sensor 17 which may be similar to the power level sensor 7 in the repeater 2. The output signal of sensor 17 is useful for determining the attenuation of the transmission path and for controlling the average power level in a duplicate traveling wave tube power amplifier 14 that is located in a feedback loop associated with amplifier 9.

From the high gain amplifier 9 the received telemetry and communication signals are applied to a frequency shift modulator 10, which is similar to frequency shift modulator 3 but shifts the frequencies of the signals in the reverse direction, so that the signals applied to the duplicate repeater 12, which forms a part of the feedback loop of amplifier 9, are in the same frequency range as the signals originally applied to the remote repeater 2.

The output signals of modulator 10 are also applied to a demodulator 11, which derives therefrom the communication signals and telemetry signals and separates them as indicated by the various channels designated in FIG. 1. Without the feedback provided by duplicate repeater 12, the output communication signals from demodulator 11 would have all the distortion imparted to them by traveling wave tube power amplifier 4 in the remote repeater 2. However, a negative feedback path is provided for the purpose of reducing distortion according to the basic principles of the above-cited patent to H. S. Black. The output of modulator 10 is fed back to the indicated negative input of summing circuit 18 through duplicate repeater 12 comprising frequency shifting modulator 13 and traveling wave tube power amplifier 14 and then through attenuator 15. Repeater 12 is designed to be a duplicate of the remote repeater 2, while attenuator 15 is intended to simulate the transmission path. According to the invention, this feedback path is continually adapted to the changing conditions of repeater 2 as follows: The telemetry signal indicative of the bias conditions of traveling wave tube power amplifier 4 is applied to the traveling wave tube power amplifier 14 to produce corresponding bias conditions there; and the telemetry signal indicative of the operating temperature of amplifier 4 is applied to produce a like operating temperature of amplifier 14 by means of conventional temperature control techniques. The telemetry signal indicative of the average signal power level in traveling wave tube power amplifier 4 is applied to a comparator and servo-controller apparatus 16 which adjusts the setting of attenuator 15 in response to the ratio of that telemetry signal to the output of power level sensor 17 and in a sense such that attenuator 15 simulates the transmission path. Conventional techniques well-known in the automatic control art may be used in the implementation of the comparator and servo-controller 16. For example, comparator and servo-controller 16 may comprise a conventional difference amplifier responsive to the indicated inputs of the controller 16 and a servo-motor responsive to the difference amplifier in the so-called proportional mode to produce a setting of attenuator 15 that is directly related to the difference between the inputs.

One noteworthy characteristic of this arrangement is that it is not necessary to apply the telemetry signal indicative of the signal power level in repeater 2 directly to amplifier 14. That is, when attenuator 15 is properly set to simulate the path between repeater 2 and receiver 1, the action of the feedback loop will automatically produce the appropriate average power level in amplifier 14. More specifically, since the high gain of amplifier 9 will tend to make the two input signals to summing circuit 18 nearly equal, the inputs to attenuator 15 and to the transmission path at the transmitting antenna of repeater 2 will also be equal if attenuator 15 and the transmission path produce like attenuation. Therefore, the average transmitted signal power level from repeater 2 must be equal to the average output signal power level of duplicate repeater 12.

In operation the parameters sensed by the comparator and bias sensors 5, 6, and 7 will usually vary slowly as compared to a cycle of the radio frequency signals in the system. Thus, under normal conditions extremely rapid responses of these components will not be needed. In particular, if amplifier 4 and repeater 2 pass from a linear mode of operation to a nonlinear mode of operation only for a duration of a few cycles of the radio frequency carrier waves, the resulting distortion will probably not be significant to the information being communicated. Nevertheless, it is presently within the state of the art to implement the various telemetry and controller circuits to have extremely high speeds of response, if this becomes necessary.

The operation of the invention in reducing distortion depends upon the fact that the amplification from the antenna of receiver 1 to the output of modulator 10 is approximately the reciprocal of the amplification provided by duplicate repeater 12 and attenuator 15, if the amplification of amplifier 9 is great enough that the total amplification around the loop from the input of amplifier 9 to the output of attenuator 15 is much greater than unity. Then, the amplification factor from the antenna of receiver 1 to the output of modulator 10 is likewise the reciprocal of the amplification factor of repeater 2 together with the transmission path for every signal amplitude passing through the system, whether or not nonlinear distortion occurs. The overall amplification of the system shown in FIG. 1 to the output of modulator 10 is the product of these two amplification factors, the product being unity. Accordingly, the output of modulator 10 includes a substantially accurate reproduction of the signals applied to the input of repeater 2, regardless of amplitude, or nonlinear, distortion present in the remote repeater.

It also may be noted, for extremely high radio carrier frequencies such as used in satellite communication systems, that the phase shift attributable to the delay around the feedback loop may become sufficiently great that the operation of the invention in reducing distortion is impaired. In that event, the feedback system for reducing distortion can be made to operate entirely at base-band frequencies, so that the effective phase shift is less. Moreover, in some communication systems, significant amounts of distortion may be introduced in the original transmitter, not shown in FIG. 1, and in the demodulator 11 of receiver 1, as well as in the repeater 2. A modified embodiment of the invention intended to deal with these problems is shown in FIG. 2.

The communication signal to be transmitted is derived from an input source 21 and applied to a transmitter 22 which may typically comprise a modulator 23 and power amplifier 24. Although such a transmitter located near the source of the input signal will not usually be limited in the power available to it, some distortion may nevertheless occur in amplifier 24. It is assumed here that this distortion is not signal amplitude-dependent. From the transmitting antenna of transmitter 22, the modulated and amplified signal is transmitted via a tarnsmission path 101 to the remote repeater 2, which is the same as the repeater 2 of FIG. 1. Since the traveling wave tube power amplifier 4 is power limited as explained hereinbefore, substantial distortion may occur in amplifier 4. From repeater 2 the frequency shifted and amplified signals are transmitted through a transmission path 102 to a receiver 31 which is a modified version of receiver 1 of FIG. 1.

In the receiver 31, the principal portion of the received signals are applied to a demodulator 32 which is analogous to demodulator 11 of FIG. 1 and the demodulated communication signals are applied to a summing circuit 33 which is similar to summing circuit 18 of FIG. 1. It is noted that circuit 33 need operate only at base-band frequencies. In summing circuit 33 the received communication signals are combined with the output of a feedback loop to be described herenafter. The output of summing circuit 33 is applied to a high gain amplifier 34 and the output of amplifier 34 is applied in part to the output of the receiver and in part through a feedback path which comprises duplicate transmitter 35, duplicate repeater 36, attenuator 15 intended to simulate ransmission path 102 and a duplicate demodulator 37, which is identical to demodulator 32. Duplicate transmitter 35 comprises a modulator 43 which is identical to modulator 23 of transmitter 22 and a power amplifier 44 which is identical to power amplifier 24 of transmitter 22. Since the distortions in transmitter 22 and duplicate transmiter 35 are not amplitude-dependent, there is no need to simulate the transmission path 101. It is further considered that any distortions introduced in transmitter 22 are sufficiently stable with respect to time that it is not necessary to continually adjust the ambient conditions and operating characterstics of transmitter 22. However, if there is such variable distortion, these conditions and characteristics may be modified in the manner analogous to that used to control the conditions and characteristics of the duplicate repeater 36. This would require additional telemetry channels in the system. Similarly, it is believed that the distortion introduced by demodulator 32 is sufficiently stable with respect to time that duplicate demodulaor 37 does not need to be continually adapted thereto. Attenuator 15 is controlled exactly as is attenuator 15 of FIG. 1 and the traveling wave tube power amplifier 54 of duplicate repeater 36 is controlled exactly as is the power amplifier 14 of FIG. 1. In operation, a small amount of delay around the feedback loop does not produce a significant phase difference between the output of demodulators 32 and 37 because the entire feedback loop is operating at base-band frequencies.

It is of course clearly desirable that in both the embodiment of FIG. 1 and embodiment of FIG. 2 that the transmission delay in the feedback loop be kept at an absolute minimum, as explained in the above-cited Patent No. 2,284,555 to Black. In either embodiment of the present invention, the adaptive control insures that the duplicate repeater in the feedback loop of each receiver will continually and accurately simulate the power limited remote repeater that produces the distortion which must be compensated.

What is claimed is:

1. A system for reducing distortion in signals received from a remotely located distortion producing network subject to a variable operating condition that affects the distortion produced, comprising an amplifying circuit having an input adapted to receive said signals and having an output, a feedback network having an input connected to said output of said amplifying circuit and having an output connected to said input of said amplifying circuit in negative feedback relationship, said feedback network including adjustable control apparatus that provides said feedback network with a variable capability for producing distortion, and means responsive to said operating condition of said remotely located network for adjusting said control apparatus in a sense that enables said feedback network to simulate said produced distortion.

2. A system for reducing distortion in signals received through a variably attenuating transmission path from a remotely located distrotion producing network having a variable operating signal level that affects the distortion produced, comprising an amplifying circuit having an input adapted to receive said signals and having an output, a feedback network having an input connected to said amplifying circuit output and having an output connected to said amplifying circuit input in negative feedback relatioship, said feedback network including a network simulating said remotely located network and an attenuator that is adjustable to control the signal level in said simulating network, and means responsive to said operating signal level of said remotely located network and responsive to the level of said received signals for adjusting said attenuator in a sense to simulate said variably attenuating transmission path, whereby said simulating network operates at the same signal level as said remotely located distortion producing network.

3. A system according to claim 2 in which the remotely located distortion producing network is subject to a variable operating condition in addition to the operating signal level, said variable operating condition affecting the distortion produced, the simulating network being subject to a variable operating condition like said variable operating condition of said distortion producing network, and means for controlling said variable operating condition of said simulating network to be substantially equal to said variable operating condition of said distortion producing network.

4. A system according to claim 2 in which the remotely located distortion producing network produces distortion that commences as signals reach a particular level, said distortion producing network being subject to a variable operating condition that varies said particular level, the simulataing network being subject to a like variable operating condition, and means for controlling said variable operating condition of said simulating network to be substantially equal to said variable operating condition of said distortion producing network.

5. A system according to claim 2 in which the remotely located distortion producing network is subject to variable temperature and electrical bias that affect the distortion produced, the simulating network being similarly subject to variable temperature and electrical bias to produce a distortion like said distortion of said remotely located network for like temperature and bias, and means for controlling said temperature and bias of said simulating network to be substantially equal to said temperature and said bias, respectively, of said remotely located network.

6. A system for reducing distortion in signals received from a remotely located distortion producing network subject to variable ambient conditions and variable signal levels that affect the distortion produced, comprising an amplifying circuit having an input adapted to receive said signals and having an output, a feedback network having an input connected to said amplifying circuit output and having an output connected to said amplifying circuit input in negative feedback relationship, said feedback network including a duplicate network that is a duplicate of said remotely located distortion producing network, said feedback network also including means for simulating the attenuation between said remotely located network and said amplifying circuit to make the average signal level in said duplicate network follow the average signal level in said remotely located network, means for telemetering said variable ambient conditions from said remotely located network, and means responsive to said telemetering means for providing like ambient conditions for said duplicate network.

7. A system for reducing distortion according to claim 6 in which the remotely located distortion producing network comprises a communication repeater having multiple communication channels and the telemetering means comprises sensors responsive to the variable ambient conditions to produce electrical signals and means for transmitting said electrical signals from said sensors through at least one of said channels, the ambient condition providing means for said duplicate network being adapted to respond to said electrical signals in said one channel.

8. A system for reducing distortion in signals received from a remotely located distortion producing network comprising a frequency-shifting modulator and a traveling wave tube power amplifier effective to repeat signals in a multiplicity of communication channels, said power amplifier being characterized in that variable signal levels in said power amplifier produce a variable nonlinear distortion and characterized in that the temperature and electrical bias of said power amplifier affect the signal level at which nonlinear distortion commences, comprising a receiver separated from said remotely located network by a transmission medium having a variable attenuation, said receiver comprising a demodulator and an amplifying circuit having an input and an output, a feedback network having an input connected to said amplifying circuit output and having an output connected to said amplifying circuit input in negative feedback relationship, said feedback network including adjustable control apparatus that provides said feedback network with a variable capability for producing distortion, and means responsive to an average signal level, to said temperature and to said bias of said remotely located network for transmitting control data indicative of said average signal level, temperature and bias through at least one of said channels, said demodulator being coupled to said control apparatus to apply said data in said one channel to said control apparatus, said control apparatus being responsive to said data in a sense that adapts said feedback network to produce nonlinear distortion like said nonlinear distortion of said traveling wave tube power amplifier.

9. A system according to claim 8 in which the feedback network includes a traveling wave tube power amplifier identical to said traveling wave power amplifier in the remotely located network, said control apparatus being adapted to produce signal levels, temperature and bias in said power amplifier in said feedback circuit like said signal levels, temperature and bias in said power amplifier in said remotely located network.

References Cited

UNITED STATES PATENTS

| | | | |
|---|---|---|---|
| 2,204,216 | 6/1940 | Harnett | 325—472 |
| 2,992,417 | 7/1961 | Hoefs | 340—207 |
| 3,315,164 | 4/1967 | Ferguson | 325—4 |

ROBERT L. GRIFFIN, *Primary Examiner.*

A. MAYER, *Assistant Examiner.*

U.S. Cl. X.R.

325—472